(12) United States Patent
Fowkes

(10) Patent No.: US 8,141,643 B2
(45) Date of Patent: Mar. 27, 2012

(54) METHOD AND FRAME

(75) Inventor: Mick Fowkes, Aberdeenshire (GB)

(73) Assignee: Subsea 7 Limited, Aberdeenshire (GB)

(*) Notice: Subject to any disclaimer, the term of this patent is extended or adjusted under 35 U.S.C. 154(b) by 0 days.

(21) Appl. No.: 11/881,888

(22) Filed: Jul. 30, 2007

(65) Prior Publication Data
US 2008/0035327 A1 Feb. 14, 2008

(30) Foreign Application Priority Data
Aug. 10, 2006 (GB) .................................. 0615884.4

(51) Int. Cl.
*E21B 23/00* (2006.01)
(52) U.S. Cl. ......... 166/338; 166/341; 166/351; 405/158
(58) Field of Classification Search .................. 166/338, 166/339, 341–343, 352, 368, 378, 381; 405/203–205, 211, 158, 184.4
See application file for complete search history.

(56) References Cited

U.S. PATENT DOCUMENTS

| | | | | | |
|---|---|---|---|---|---|
| 3,204,417 | A | * | 9/1965 | Robley | 405/170 |
| 3,267,682 | A | * | 8/1966 | Robley | 405/170 |
| 3,529,731 | A | * | 9/1970 | Penny | 29/237 |
| 3,641,777 | A | * | 2/1972 | Banjavich et al. | 405/188 |
| 3,657,786 | A | * | 4/1972 | Wiswell, Jr. | 29/244 |
| 3,953,982 | A | * | 5/1976 | Pennock | 405/168.1 |
| 3,987,638 | A | * | 10/1976 | Burkhardt et al. | 405/203 |
| 4,051,687 | A | * | 10/1977 | Ells | 405/173 |
| 4,051,688 | A | * | 10/1977 | Ells et al. | 405/170 |
| 4,075,862 | A | * | 2/1978 | Ames | 405/169 |
| 4,197,033 | A | * | 4/1980 | Gendron | 405/170 |
| 4,218,158 | A | * | 8/1980 | Tesson | 405/170 |
| 4,304,505 | A | * | 12/1981 | Silvestri et al. | 405/170 |
| 4,363,566 | A | * | 12/1982 | Morton | 405/169 |
| 4,377,354 | A | * | 3/1983 | Morton | 405/171 |
| 4,412,370 | A | * | 11/1983 | Speirs | 24/268 |
| 4,443,129 | A | * | 4/1984 | de Sivry et al. | 405/170 |
| 4,459,065 | A | * | 7/1984 | Morton | 405/169 |
| 4,465,400 | A | * | 8/1984 | Adams | 405/170 |
| 4,474,507 | A | * | 10/1984 | Morton | 405/158 |
| 4,559,716 | A | * | 12/1985 | Daughtry et al. | 33/529 |
| 4,601,610 | A | * | 7/1986 | Campbell et al. | 405/188 |
| 4,602,893 | A | * | 7/1986 | Gist et al. | 405/185 |

(Continued)

FOREIGN PATENT DOCUMENTS

EP 0 260 143 9/1987

(Continued)

*Primary Examiner* — Thomas Beach
*Assistant Examiner* — Matthew Buck
(74) *Attorney, Agent, or Firm* — Levy & Grandinetti

(57) ABSTRACT

A method of installing equipment subsea comprising the steps of: assembling the equipment within a frame; submerging in the sea at least a part of an assembly comprising the frame and the equipment; coupling the at least partially submerged assembly to a vessel; transporting the at least partially submerged assembly proximate a subsea installation site; coupling the assembly to an installation device; and installing the equipment at the installation site using the installation device. A frame for supporting equipment is also disclosed wherein the frame is shaped to match the dimensions of the equipment to be supported. The frame comprises at least one clamp having a first half clamp member for releasably engaging a second half clamp member of a second structure and a full clamp member for clamping around and supporting the equipment. The first half clamp member and the full clamp member can be integrally formed.

23 Claims, 9 Drawing Sheets

U.S. PATENT DOCUMENTS

| | | | | |
|---|---|---|---|---|
| 4,797,035 | A * | 1/1989 | Hunter | 405/205 |
| 5,244,045 | A * | 9/1993 | Mota | 166/341 |
| 5,341,884 | A * | 8/1994 | Silva | 166/347 |
| 5,458,440 | A * | 10/1995 | Van Helvoirt | 405/169 |
| 5,518,340 | A * | 5/1996 | Hall et al. | 405/158 |
| 5,707,174 | A * | 1/1998 | Garren | 405/159 |
| 5,730,551 | A * | 3/1998 | Skeels et al. | 405/170 |
| 5,971,665 | A * | 10/1999 | Hughes | 405/159 |
| 6,142,708 | A * | 11/2000 | Tarlton et al. | 405/170 |
| 6,276,875 | B1 * | 8/2001 | Gunnar et al. | 405/203 |
| 6,290,432 | B1 * | 9/2001 | Exley et al. | 405/173 |
| 6,375,391 | B1 * | 4/2002 | Børseth et al. | 405/224.4 |
| 6,397,948 | B1 * | 6/2002 | Williams et al. | 166/363 |
| 6,405,802 | B1 * | 6/2002 | Williams | 166/344 |
| 6,443,660 | B1 * | 9/2002 | Smith et al. | 405/224 |
| 6,588,980 | B2 * | 7/2003 | Worman et al. | 405/158 |
| 6,718,997 | B2 * | 4/2004 | Biszko | 137/1 |
| 6,742,594 | B2 * | 6/2004 | Langford et al. | 166/350 |
| 6,752,100 | B2 * | 6/2004 | Guinn et al. | 114/258 |
| 6,767,165 | B1 * | 7/2004 | Corbetta | 405/170 |
| 6,796,261 | B2 * | 9/2004 | Colyer | 114/258 |
| 6,902,199 | B2 * | 6/2005 | Colyer et al. | 285/29 |
| 6,957,929 | B1 * | 10/2005 | Rachel et al. | 405/158 |
| 7,044,228 | B2 * | 5/2006 | Langford et al. | 166/350 |
| 7,445,404 | B2 * | 11/2008 | Giles et al. | 405/169 |
| 2003/0049076 | A1 * | 3/2003 | Bekkevold et al. | 405/170 |
| 2003/0221835 | A1 * | 12/2003 | Polsky et al. | 166/338 |
| 2004/0007362 | A1 * | 1/2004 | Rodgers et al. | 166/344 |
| 2004/0164572 | A1 * | 8/2004 | Bath et al. | 294/81.5 |
| 2006/0201679 | A1 * | 9/2006 | Williams | 166/344 |
| 2007/0227740 | A1 * | 10/2007 | Fontenette et al. | 166/344 |
| 2008/0014023 | A1 * | 1/2008 | Webster | 405/166 |

FOREIGN PATENT DOCUMENTS

| | | |
|---|---|---|
| GB | 2 403 976 | 1/2005 |
| WO | WO 01/92683 | 12/2001 |

* cited by examiner (Detail A)

METHOD AND FRAME

FIELD OF THE INVENTION

The invention provides a method of installing equipment subsea and a frame for supporting equipment. In particular the invention relates to a method of installing equipment to connect two subsea installations and a frame suitable for supporting and transporting the equipment.

DESCRIPTION OF RELATED ART

Spool pieces (or jumpers) are lengths of tubular that are typically used in the hydrocarbon production industry to join terminations on two subsea installations. Each end of the spool piece is provided with terminations that mate with the terminations on the subsea installations. The spool pieces are often bespoke and are designed and constructed with the required dimensions according to the relative separation and orientation of the two subsea terminations.

Spool pieces typically have a greater relative length than diameter. As a result, the spool pieces have a relatively low structural strength and must be deployed in a manner that provides adequate support for the spool piece. Conventionally, the spool piece is attached to a lifting beam using multiple suspension points along its length, or built into a lifting frame for support, then lowered through the sea to the installation site.

BRIEF SUMMARY OF THE INVENTION

According to a first aspect of the invention, there is provided a method of installing equipment subsea, the method comprising the steps of:
 (a) assembling the equipment within a frame;
 (b) submerging in the sea at least a part of an assembly comprising the frame and the equipment;
 (c) coupling the at least partially submerged assembly to a vessel;
 (d) transporting the at least partially submerged assembly proximate a subsea installation site;
 (e) coupling the assembly to an installation device; and
 (f) installing the equipment at the installation site.

According to step (a), the equipment can be assembled within the frame onshore. The method can include towing the frame across the shoreline and into the water. The method can include fully submerging the assembly comprising the frame and the equipment.

According to a second aspect of the invention, there is provided a frame for supporting equipment, wherein the frame is shaped to match the dimensions of the equipment to be supported and comprises at least one clamp, the clamp comprising a first half clamp member for releasably engaging a second half clamp member of a second structure and further comprising a full clamp member for clamping around and supporting the equipment.

The frame can comprise a structure of any shape or size with the functional requirement that it is arranged to support the equipment. For example, the frame can comprise a plurality of interconnecting struts. Alternatively, the frame could comprise a block that accommodates an amount of buoyant material.

The full clamp member can comprise two hinged jaws that are pivotable about the hinge between an open configuration in which a leading edge of each jaw is spaced from the leading edge of the other jaw and a closed configuration in which the leading edges of the jaws are brought together to thereby enclose the equipment within the full clamp member.

The full clamp member can be provided with a locking device to lock the jaws into secure engagement in the closed configuration. The locking device can comprise a hydraulically operable locking cylinder.

Preferably, the first half clamp member and the full clamp member are integrally formed.

The first half clamp member can comprise two leading edges that are arranged to engage two leading edges of the second half clamp member on the second structure.

The leading edges of the jaws of the full clamp member and/or the leading edges of the first and the second half clamp members can be provided with interlocking castellations.

The first half clamp member can be provided with a locking arrangement to lock the first half clamp member and the second half clamp member into secure engagement. The locking arrangement can comprise a passageway through each the leading edge of the first half clamp member extending through the leading edge of the second half clamp member wherein each passageway accommodates a retractable locking pin.

The second structure can include at least one second half clamp member arranged for engagement with the at least one first half clamp member of the frame.

The second structure can be arranged to carry the load of the frame when the second half clamp member and the first half clamp member of the frame are engaged in use.

The second structure can be a launch frame. The second structure can be provided with at least one substantially planar runner arranged to contact a surface in use. The at least one runner can be provided with an upturned end portion along at least one edge to facilitate movement of the second structure along a surface.

The at least one clamp can be carried by a support formed as part of the frame. The at least one second half clamp member can be carried on a support formed as part of the second structure. The frame can be provided with a plurality of supports carrying clamps to support the equipment along its length. The second structure can be provided with a plurality of corresponding supports carrying the second half clamp members.

The frame can comprise two or more feet for supporting the frame on a surface in use. The feet can be substantially coplanar. The frame can be constructed to transfer the load through the feet when the frame is upright and supported on a surface in use.

The frame can further comprise a lifting portion provided with at least one lifting point, selected such that the frame can be suspended in the sea from the at least one lifting point. Preferably, the lifting point is selected such that the frame remains substantially level relative to the seabed when suspended from the at least one lifting point in the sea.

The frame of the first aspect of the invention can comprise any of the features and corresponding method steps according to the second aspect of the invention described above.

Thus, according to step (a), the method can include supporting the equipment on the second structure, coupling the frame to the second structure and the equipment and towing the second structure into the water.

Following step (b), the method can include detaching the second structure from the frame. This step can include releasing the second half clamp member portion from the first half clamp member. The method can include parking the assembly on the seabed prior to releasing the second half clamp member from the first half clamp member.

The method can include actuating the locking arrangement to thereby release the first half clamp member from the second half clamp member. This can be achieved using a remotely operated vehicle or a diver.

The method can also include attaching a recovery line to the second structure and recovering the second structure following detachment from the frame. The method can include reconfiguring the second structure for use with another item of equipment to be installed subsea.

According to step (c), the vessel can be provided with a lifting mechanism and the lifting portion of the frame can be attached to the lifting mechanism that is actuable to couple the frame to the vessel. The lifting mechanism can comprise a heave-compensated winch.

According to step (c), the method can include locking the frame to the vessel. Locking members can be provided on the vessel for this purpose.

Preferably, according to step (d), the method includes transporting the equipment below the splash zone of the sea.

The method can further include sheltering the equipment and the frame during transportation through the sea. The method can include constructing sidewalls on a part of the vessel that is arranged to be submerged in use, to thereby define a recess beneath the vessel. The method can include sheltering the frame and equipment within the recess. The method can include deviating the flow away from the assembly and around the submerged part of the vessel in use.

The method can include adding buoyancy to at least one of: the vessel; the equipment; and the frame.

The method can include providing an opening in the hull of the vessel to accommodate at least part of the frame within the opening. The vessel can be a substantially flat-bottomed vessel such as a barge or pontoon.

Prior to step (e) the assembly can be parked proximate the installation site, pending coupling the assembly to the installation device.

According to step (e), the method can include coupling the assembly to an installation vessel and can include coupling the assembly to a crane provided on the installation vessel.

Following step (f), the method can include releasing the frame from the equipment. The method can include pivoting the jaws of the full clamp member to the open configuration and thereby releasing the equipment.

The method can further include recovering the frame. The frame can be recovered using the installation device. The frame can be transported to shore using the vessel. The method can further include reconfiguring the frame for use with another item of equipment to be installed subsea.

The equipment to be installed subsea can comprise a subsea connector with end terminations for connecting two subsea installations.

"Subsea" or "sea" as used herein is intended to refer to any body of liquid that may contain water (fresh water or salt water or otherwise) and "seabed" is intended to refer to a lower surface of the "sea" as defined herein.

BRIEF DESCRIPTION OF SEVERAL VIEWS OF THE DRAWINGS

One embodiment of the invention will now be described with reference to and as shown in the accompanying drawings, in which.

DETAILED DESCRIPTION OF THE INVENTION

A spool piece 20 according to the present embodiment is a small bore pipeline that is shaped and manufactured with the required dimensions to connect a particular pipeline end termination 110 to a subsea manifold 112 (shown in FIGS. 13 to 17) to allow fluid communication therebetween. The spool piece 20 is manufactured with two end portions 22, 24 that carry the necessary end terminations in the correct orientation for interconnection with the pipeline end termination 110 and the subsea manifold 112.

Figure 1:
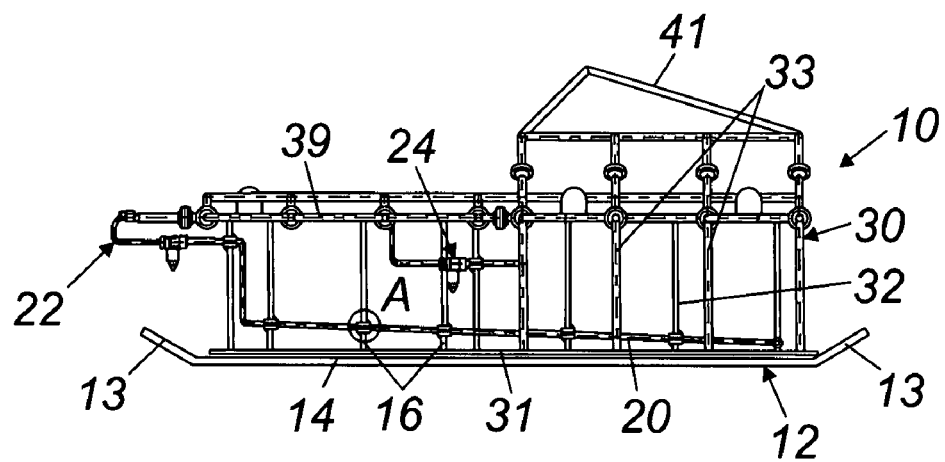
FIG. 1 is a side view of a frame assembly carrying a spool piece.
Figure 2:
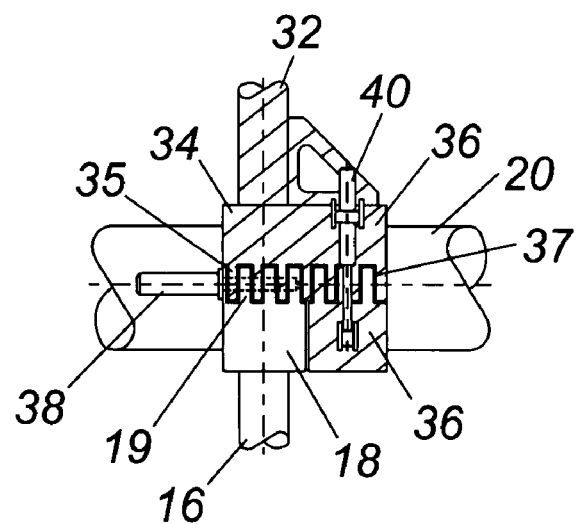
FIG. 2 is a side view of detail A in FIG. 1.

A frame assembly is shown generally at 10 in FIG. 1. The frame assembly 10 is provided in two parts: a spool frame 30; and a second structure in the form of a launch frame or sledge 12.

The sledge 12 is constructed according to the specific dimensions of the spool piece 20. The sledge 12 has runners 14 that are arranged to lie parallel to the surface of the ground or the seabed 94 in use. The runners 14 have upturned ends 13 to the front and rear of the sledge 12, to facilitate movement of the sledge 12 over a surface. A plurality of upstanding supports 16 project perpendicular to the runners 14. Each of these supports 16 is arranged at the requisite height and position corresponding to the shape of the spool piece 12 to be carried within the frame assembly 10. An upper end of each support 16 carries a half clamp member 18 in the form of a hollow semi-cylindrical portion. The inner diameter of the half clamp member 18 is shaped to accommodate a portion of the spool piece 20. The edges of the half clamp member 18 are provided with castellations 19 having a transverse cylindrical passageway (not shown) extending therethrough for receiving an hydraulically operable locking pin 38 that is extendable and retractable through the passageway. The sledge 12 is also provided with appropriately located pad eyes (not shown) for attaching towlines and recovery lines thereto.

The spool frame 30 is also manufactured according to the specific dimensions of the spool piece 20. The spool frame 30 comprises three lengths of substantially co-planar parallel feet 31. The feet 31 are arranged to contact the surface or the seabed on which the spool frame 30 is parked in use, in order to maintain the spool frame 30 in an upright orientation. The feet 31 support upstanding struts 33 that are substantially perpendicular to the plane of the feet 31. The upstanding struts 33 are connected to cross-wise struts 39 that are arranged substantially perpendicular to the struts 33. A plurality of supports 32 project downwardly from the cross-wise struts 39. The supports 32 are parallel to the struts 33.

Each spool frame support 32 carries a clamp. The clamp comprises a half clamp member 34 that is integrally formed with a full clamp member 36. Each half clamp member 34 is substantially hollow and semi-cylindrical and has ends which are provided with castellations 35 that interfit with the castellations 19 provided on the half clamp member 18 of the sledge 12. Similarly, the castellations 35 have a centrally disposed cylindrical passageway extending therethrough to accommodate the hydraulically operable locking pin 38 to thereby lock the castellations 19 of the half clamp member 18 to the castellations 35 of the half clamp member 34.

Figure 20:
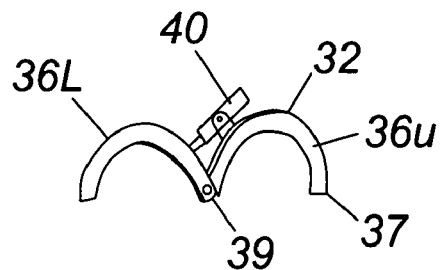
FIG. 20 is an end view of the full clamp member of FIG. 19 in the open configuration.

The full clamp member 36 is substantially cylindrical, hollow and arranged to enclose the spool piece 20. The full clamp member 36 (see FIG. 20) comprises an upper jaw 36*u* and a lower jaw 36*l* that is pivotable about a hinge 39 relative to the upper jaw 36*u*. The leading edges of the jaws 36*u*, 36*l* are provided with interlocking castellations 37. The jaws 36*u*, 36*l* are pivotable between an open configuration in which the leading edges are spaced apart to thereby release or allow insertion of the spool piece 20 within the clamp, and a closed configuration in which the edges are brought together to retain the spool piece 20 within the jaws 36*u*, 36*l*. The full clamp member 36 is lockable in the closed configuration by means of a hydraulic locking arrangement 40.

Figure 3:
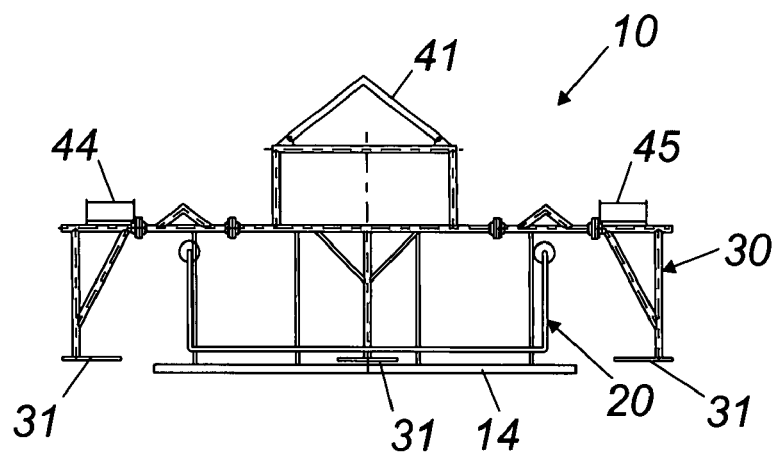
FIG. 3 is a front end view of the frame assembly of FIG. 1.
Figure 4:
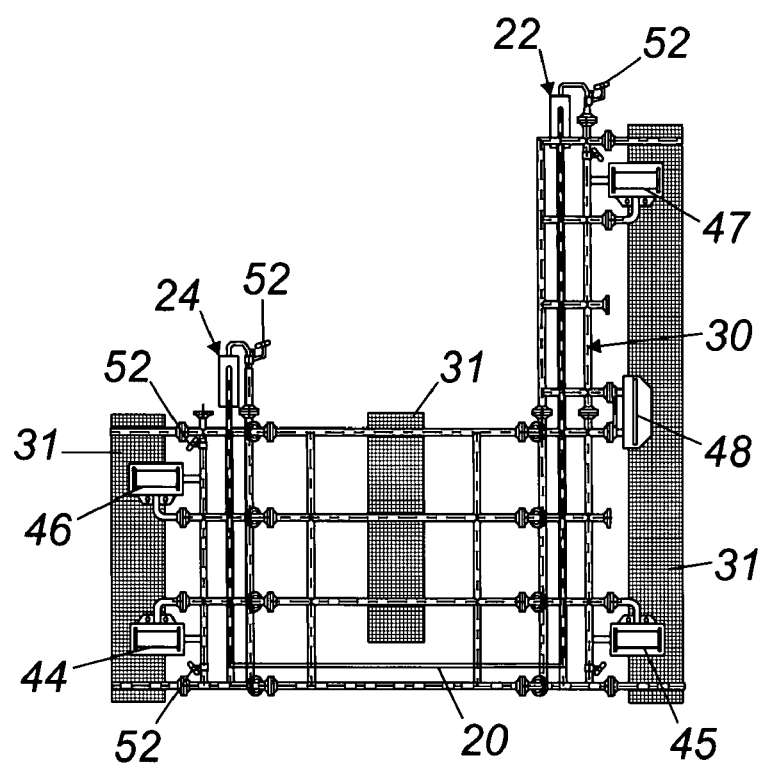
FIG. 4 is a plan view of the frame assembly of FIG. 1.

The spool frame 30 has a lifting portion 41 having lift points arranged thereon to ensure an even lift of the frame assembly 10. Two winches 44, 45 are provided on opposing sides towards the front end of the spool frame 30. Two further winches 46, 47 on opposing sides are provided towards the rear end of the spool frame 30. A remotely operated vehicle (ROV) docking station 48 is centrally disposed along one side of the spool frame as shown in FIGS. 3 and 4. The ROV docking station 48 has an ROV operable panel for a supplying power and operating a control system. Several camera and light assemblies 52 are also attached around the spool frame 30 to provide visual feedback to surface.

Figure 5:
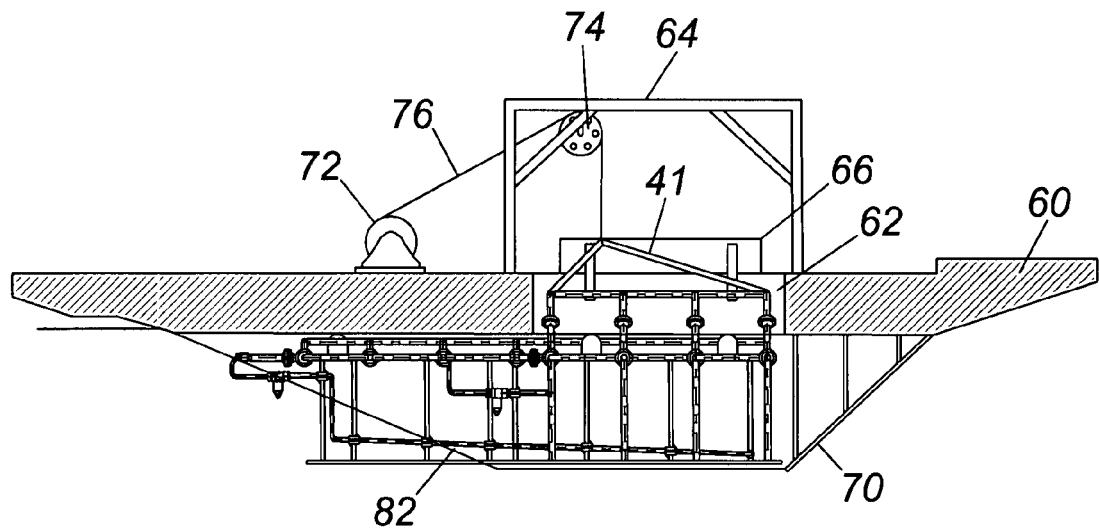
FIG. 5 is a sectional view of a pontoon and part of the frame assembly of FIG. 1.
Figure 6:
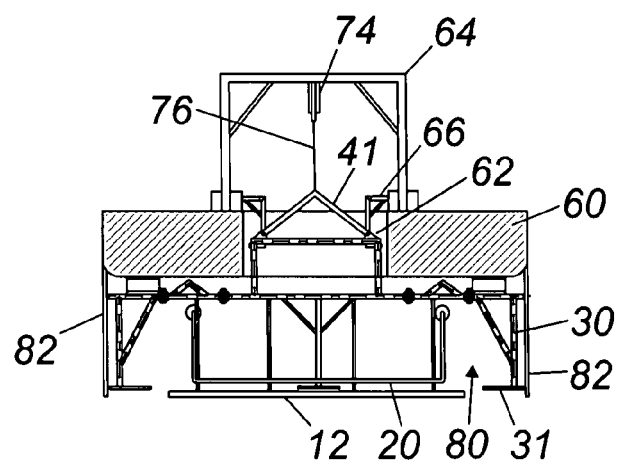
FIG. 6 is a sectional view of the pontoon perpendicular to the FIG. 5 view.
Figure 7:
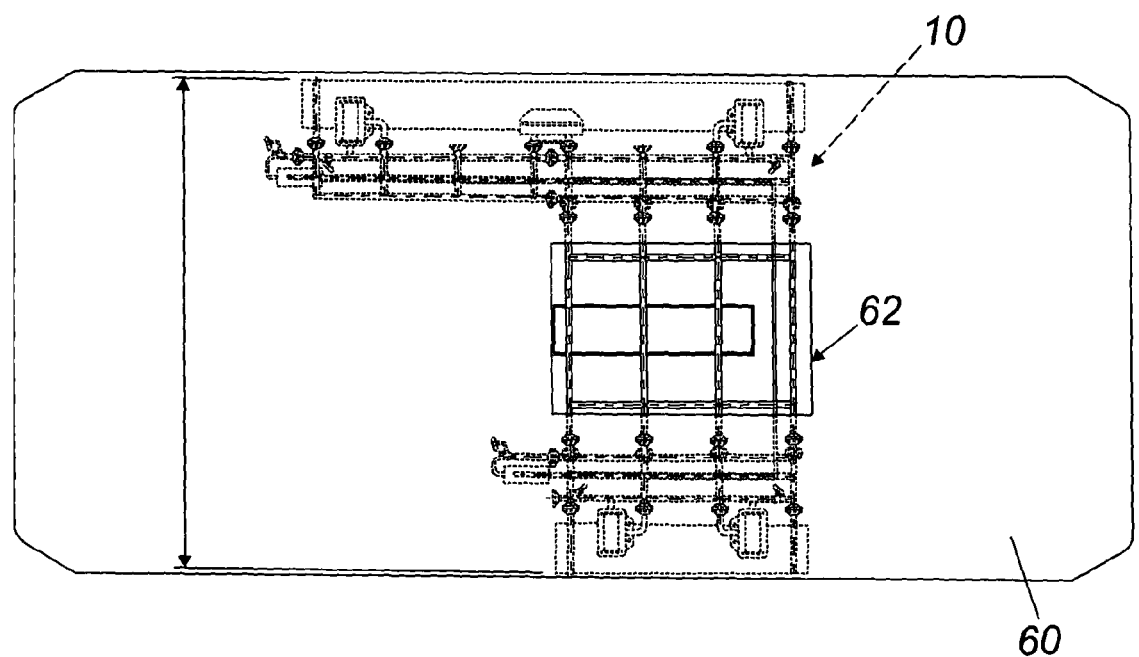
FIG. 7 is a plan view of the pontoon of FIG. 5 showing part of the frame assembly therebeneath.

FIGS. 5-7 show a flat-bottomed vessel such as a barge or a pontoon 60 that is provided with tankage of sufficient buoyancy to carry the spool frame 30 and the attached spool 20. The pontoon 60 has a moonpool 62 or opening in the hull that allows access to the sea therebelow. On the deck of the pontoon 60, a tower 64 is constructed around the moonpool 62. A heave compensated winch 72 is fixed to the deck of the pontoon 60 and has a winch line 76 attached thereto running through a pulley 74 supported by the tower 64. Two spool locks 66 are provided on opposing sides of the moonpool 62 to securely lock the spool frame 30 to the pontoon 60. A flow deviator 70 is provided beneath the front end of the pontoon 60 facing the direction of travel of the pontoon 60. The flow deviator 70 has sidewalls 82 that extend along a portion of two opposing sides of the pontoon 60. The flow deviator 70 and the sidewalls 82 define a recess 80 in which a portion of the spool frame 30 and the spool 20 can be stored during transportation.

Prior to deployment, the necessary spool piece 20 dimensions and end termination orientations are determined and the spool piece 20 is constructed onshore. Similarly, the bespoke spool frame 30 and sledge 12 is constructed according to the dimensions of the spool piece 20.

The spool piece 20 is then arranged on the half clamp members 18 provided on the upstanding supports 16 of the sledge 12. The jaws 36*u*, 36*l* of the full clamp member 36 are pivoted about the hinge 39 to ensure that the jaws 36*u*, 36*l* are moved to the open configuration. The spool frame 30 is then lowered in place over the spool piece 20 such that the downwardly extending supports 32 are aligned with the axis of the upstanding supports 16 of the sledge 12 and the castellations 19 on the half clamp member 18 and the castellations 35 on the half clamp member 34 intermesh. The half clamp members 18, 34 can be locked into secure engagement by actuating the hydraulic locking pin 38 to engage the centrally disposed passageway extending through the castellations 19, 35.

The lower jaw 36*l* of the full clamp member 36 is pivoted about the hinge 39 from the open configuration to the closed configuration to intermesh the castellations 37. The hydraulic locking arrangement 40 can be actuated to close and lock the jaws 36*u*, 36*l* of the full clamp member 36. This ensures that the spool 20 is securely located within the frame assembly 10. The spool frame 30 is arranged on the sledge 12 such that the load is transferred to the sledge 12. The winch line 76 from the heave-compensated winch 72 on the pontoon 60 is pre-attached to the lifting portion 41 of the spool frame 30.

Figure 8:
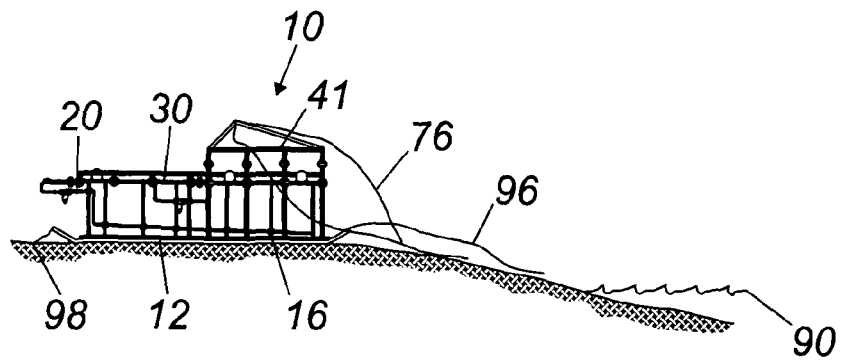
FIGS. 8-17 are consecutive steps illustrating the method according to the first aspect of the invention.
Figure 9:
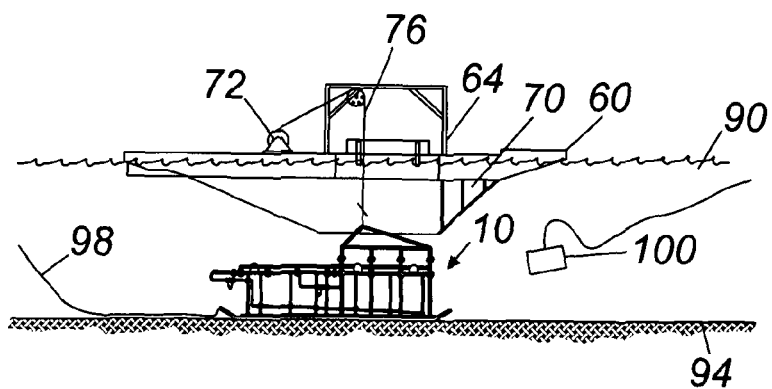

A towline 96 is attached to the front of the sledge 12 and a recovery line 98 is attached to the rear of the sledge 12, as shown in FIG. 8. A tug (not shown) is attached to the other end of the towline 96 and the frame assembly 10 is pulled such that the runners 14 move along the shore, across the shoreline and into the sea 90. The tug then pulls the frame assembly 10 along the seabed 94 to a pre-prepared site in water that is sufficiently deep (approximately 20-30 metres) for the pontoon 60 to be parked above the frame assembly 10. The pontoon 60 is manoeuvred over the frame assembly 10 such that the frame assembly 10 is positioned directly below the recess 80. The slack in the winch line 76 that was pre-attached to the lifting portion 41 is continuously taken up by the heave compensated winch 72 via the pulley 74 attached to the tower 64 (see FIG. 9).

Figure 10:
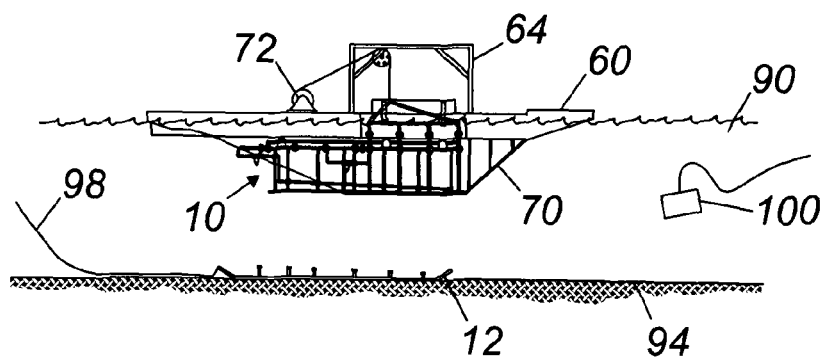
Figure 18:
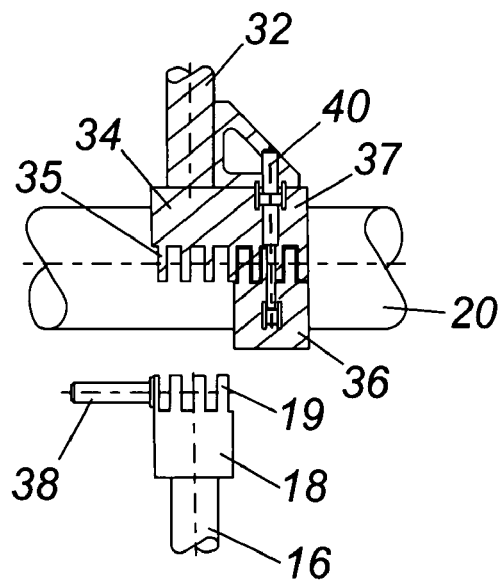
FIG. 18 is a side view of detail A of FIG. 2 with a half clamp member removed.

A work class ROV 100 is flown towards the frame assembly 10 and engages with the hydraulic locking mechanism to retract the pins 38 from the passageway through the castellations 19, 35 (FIG. 18). This releases the half clamp member 18 of the sledge 12 from the half clamp member 34 of the spool frame 30. Thus, the sledge 12 is detached from the spool frame 30 and the spool piece 20, which is retained by the clamps 36 in the closed configuration. The winch 72 is activated to lift the spool frame 30 and spool piece 20 within the recess 80 such that the lifting portion 41 is accommodated in the moonpool 62 (FIG. 10). The spool frame 30 is retained in this position by spool locks 66 provided on the pontoon 60. The sledge 12 is then recovered using the pre-installed recovery line 98 and returned to the onshore build site where it can be reconfigured for use with another spool piece.

The pontoon 60 is then towed to the region of the spool piece 20 installation site. As the spool frame 30 and attached spool piece 20 is towed through the sea 90, since the spool piece 20 is submerged and stored in the recess 80 beneath the pontoon 60, the spool piece 20 is transported beneath the splash zone, thereby substantially protecting it from damage by wave action. The spool piece 20 is also protected during transportation by the flow deviator skid 70 and the protective sidewalls 82.

Figure 11:
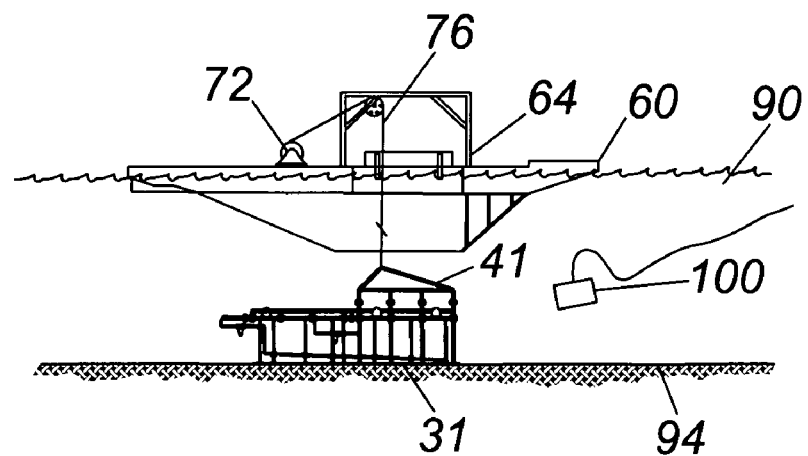

At the installation site, the pontoon 60 is tied up to a deployment vessel (not shown). The deployment vessel is then manoeuvred into the required position above the installation site. The heave-compensated winch 72 accounts for changes in the tension of the winch wire 76 due to the heave of the pontoon 60 at sea 90. The spool frame 30 and the spool piece 20 are lowered from the pontoon 60 onto the seabed 94 (FIG. 11) where the spool frame 30 and attached spool piece 20 is wet parked and the winch wire 76 is disconnected. The pontoon 60 is then held pending recovery of the spool frame 30.

Figure 12:
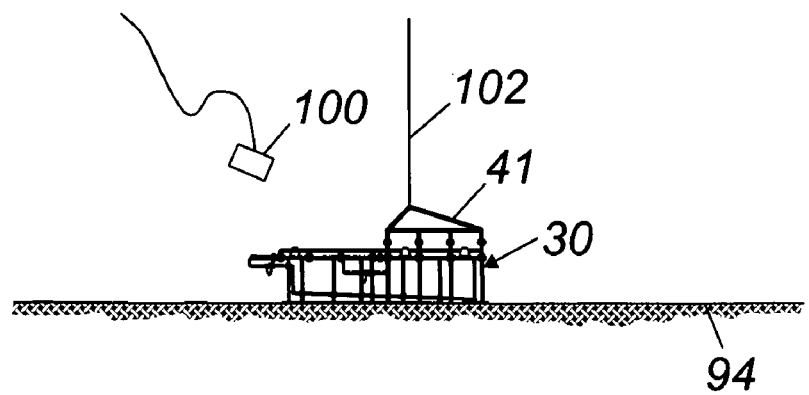

An installation winch line 102 from the installation vessel is attached to the lifting portion 41 of the spool frame 30 to couple the spool frame 30 to an installation device (not shown) in the form of an abandonment and recovery winch (or crane) to complete the installation operation (FIG. 12). Because the spool frame 30 and the spool piece 20 are submerged in the sea 90 their effective weight is reduced. Optionally, the weight of the spool frame 30 can be further reduced by incorporating buoyancy within the spool frame 30 and/or the spool piece 20. The reduction in the effective weight of the spool frame 30 and the spool piece 20 combined with the fact that the operation to install the spool piece 20 commences subsea, means that the load capacity and necessary reach of the crane is greatly reduced compared with conventional operations. The vessel lifts the spool frame 30 from its wet parked position on the seabed and locates the spool frame 30 and spool piece 20 above the installation site. Alternatively, the installation device can be in the form of a winch rather then a crane to further reduce the costs of the installation operation.

Figure 13:
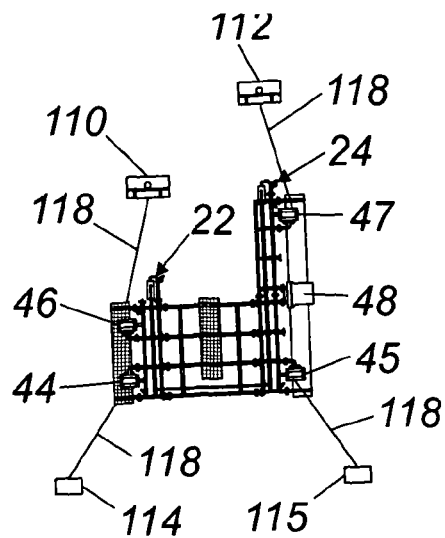
Figure 14:
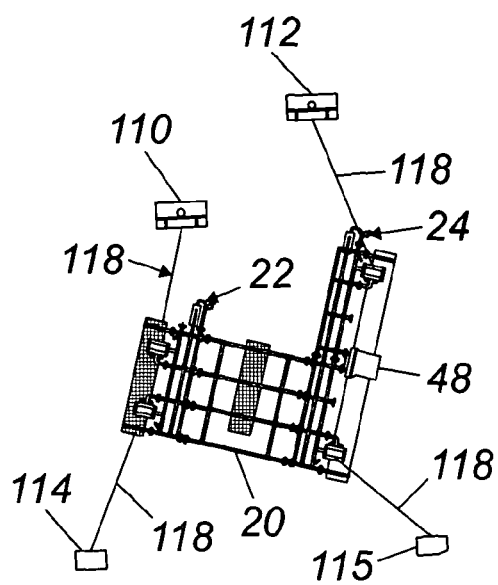
Figure 15:
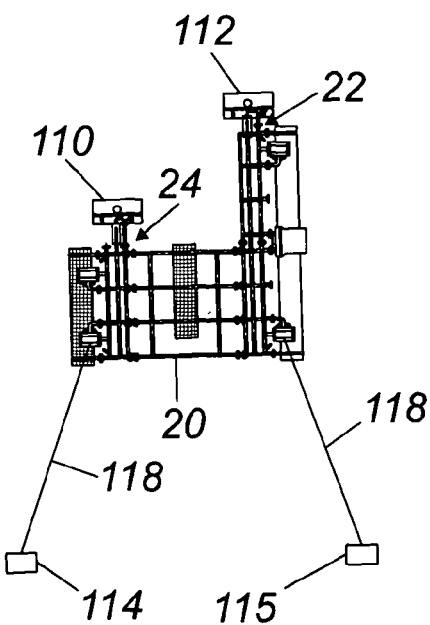

A first ROV (not shown) is docked on the ROV panel 48 of the spool frame 30 to power and control the four corner winches 44, 45, 46, 47 and the light and camera assemblies 52. A second ROV (not shown) flies winch lines 118 to pre-laid clump weights 114, 115 in the region of the installation site to thereby connect the winches 44, 45 to the clump weights 114, 115. The second ROV then flies winch lines 118 between the winch 46 and the pipeline end termination 110 and between the winch 47 and the subsea manifold 112 to thereby couple the spool frame 30 to the installation targets (FIG. 13). The spool frame 30 is manoeuvred using the winch line 102 coupled to the surface vessel in combination with the four corner winches 44, 45, 46, 47 (FIG. 14). Visual feedback is provided by the light and camera assemblies 52 and the second ROV. The position of the spool frame 30 is thus adjusted until the spool piece 20 end termination 24 is immediately adjacent the pipeline end termination 110 and the other spool piece 20 end termination 22 is immediately adjacent the subsea manifold 112 (FIG. 15). The connections between the end terminations are then made up by the second ROV. The end terminations 22, 24 of the spool piece 20 and/or the pipeline end termination 110 and the subsea manifold 112 can be provided with guides to facilitate connection of the spool piece 20 despite any misalignment. In this way, the spool piece 20 is guided into position relative to the pipeline end termination 110 and the subsea manifold 112 whilst accounting for some axial and/or radial and/or angular misalignment.

Figure 16:
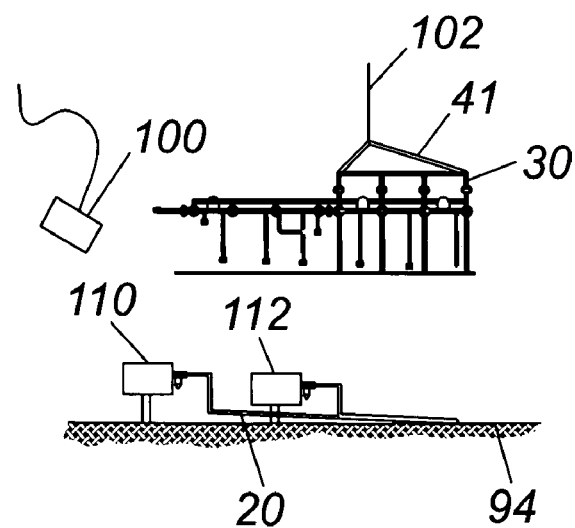
Figure 17:
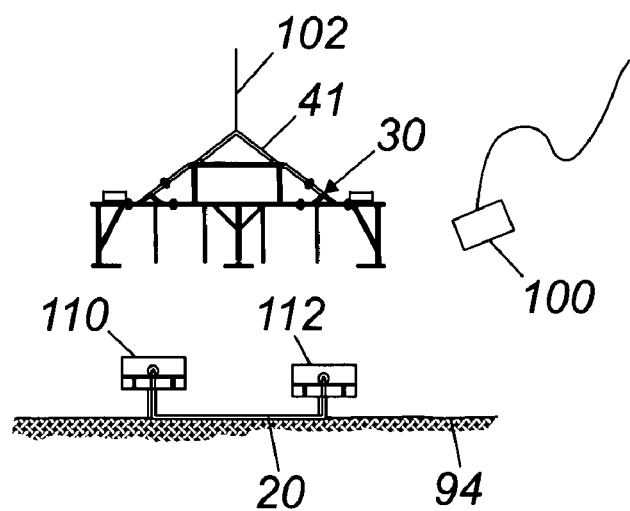
Figure 19:
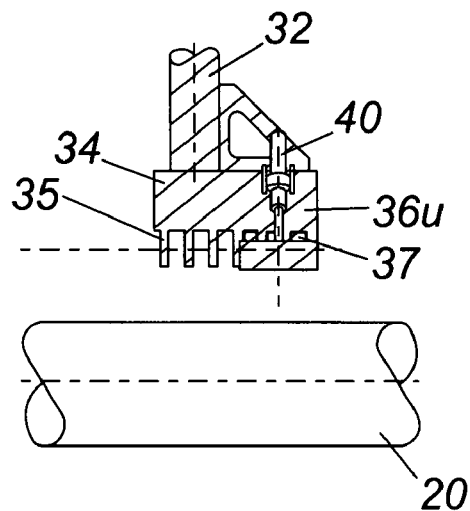
FIG. 19 is a side view of FIG. 18 with a full clamp member in an open configuration thereby freeing the spool piece.

The second ROV releases the hydraulic locking pins 40 to pivot the lower jaws 36/ about the hinges 39 to thereby move the full clamp members 36 into the open configuration and release the spool piece 20 from the spool frame 30 (FIGS. 16, 17, 19). The second ROV then releases the winch lines 118 from their attachment points on the pipeline end termination 110, the subsea manifold 112 and the clump weights 114, 115. The first ROV is also released from the control panel 48.

The spool frame 30 is again wet parked on the seabed 94 and the installation winch line 102 attaching the spool frame 30 to the installation vessel is detached. The pontoon 60 is reconnected to the spool frame 30 via the winch line 76 and the spool frame 30 is recovered into the recess 80 of the pontoon 60, which then transports the spool frame 30 to shore where the spool frame 30 can be reconfigured for use with another spool piece.

Modifications and improvements can be made without departing from the scope of the invention. For example, the spool piece can connect three or more subsea installations. Additionally, the spool pieces can be provided to connect any type of subsea structure.

The invention claimed is:

1. A method of installing a spool piece subsea, the spool piece being provided with end terminations, the method comprising the steps of:

(a) assembling the equipment within a frame and holding the end terminations of the spool piece in the frame in the correct orientation relative to one another for interconnection with subsea installations;
(b) submerging in the sea at least a part of an assembly comprising the frame and the spool piece;
(c) coupling the at least partially submerged assembly to a vessel;
(d) transporting the at least partially submerged assembly proximate a subsea installation site;
(e) coupling the assembly to an installation device;
(f) installing the spool piece at the installation site using the installation device;
(g) maneuvering the frame to thereby position the spool piece so that the end terminations of the spool piece are located immediately adjacent the respective subsea installations; and
(h) connecting the end terminations to the subsea installations whilst the spool piece is supported in position within the frame.

2. A method according to claim 1, wherein step (a) includes assembling the equipment within the frame onshore.

3. A method according to claim 1, wherein step (a) includes supporting the spool piece on a second structure and coupling the frame to the second structure and the equipment.

4. A method according to claim 3, wherein step (b) includes towing the second structure into the sea and then detaching the second structure from the frame.

5. A method according to claim 4, including attaching a recovery line to the second structure, recovering the second structure following detachment from the frame and reconfiguring the second structure for use with another item of equipment.

6. A method according to claim 1, wherein step (c) includes locking the frame to the vessel.

7. A method according to claim 1, wherein step (d) includes transporting the equipment below the splash zone of the sea.

8. A method according to claim 1, wherein the method includes sheltering the spool piece and the frame during transportation through the sea.

9. A method according to claim 1, wherein the method includes constructing sidewalls on a part of the vessel that is arranged to be submerged in use, to thereby define a recess beneath the vessel and sheltering the frame and equipment within the recess.

10. A method according to claim 1, wherein the method includes deviating the flow away from the assembly and around the submerged part of the vessel in use.

11. A method according to claim 1, wherein the method includes adding buoyancy to at least one of: the vessel; the equipment; and the frame.

12. A method according to claim 1, wherein prior to step (e), the method includes parking the assembly proximate the installation site and step (e) includes coupling the assembly to a crane provided on the installation vessel.

13. A method according to claim 1, wherein following step (f), the method includes releasing the frame from the spool piece, recovering the frame and reconfiguring the frame for use with another item of equipment.

14. A frame for supporting a spool piece having end terminations for connecting subsea installations, wherein the frame is shaped to match the dimensions of the spool piece to be supported, such that the end terminations of the spool piece are held in the frame in the correct orientation relative to one another for interconnection with subsea installations, and wherein the frame comprises at least one clamp, the clamp comprising a first half clamp member for releasably engaging a second half clamp member of a second structure and further comprising a full clamp member for clamping around and supporting the spool piece within the frame, and wherein the frame is further provided with a maneuvering device which operates to maneuver the frame and thereby position the spool piece supported by the frame into a position in which said end terminations are located immediately adjacent respective subsea installations to allow the connection between the end terminations of the spool piece and the subsea installations to be made up.

15. A frame according to claim 14, wherein the full clamp member comprises two hinged jaws that are pivotable about the hinge between an open configuration in which a leading edge of each jaw is spaced from the leading edge of the other jaw and a closed configuration in which the leading edges of the jaws are brought together to thereby enclose the equipment within the full clamp member, and wherein the full clamp member is provided with a locking device to lock the jaws into secure engagement in the closed configuration.

16. A frame according to claim 15, wherein the locking device comprises a hydraulically operable locking cylinder.

17. A frame according to claim 14, wherein the first half clamp member and the full clamp member are integrally formed.

18. A frame according to claim 14, wherein the first half clamp member comprises two leading edges that are arranged to engage two leading edges of the second half clamp member on the second structure, and wherein the leading edges of the first and the second half clamp members are provided with interlocking castellations.

19. A frame according to claim 14, wherein the first half clamp member is provided with a locking arrangement to lock the first half clamp member and the second half clamp member into secure engagement, wherein the locking arrangement comprises a passageway through each the leading edge of the first half clamp member extending through the leading edge of the second half clamp member wherein each passageway accommodates a retractable locking pin.

20. A frame according to claim 14, wherein the frame comprises two or more feet for supporting the frame on a surface and the frame is constructed to transfer the load through the feet when the frame is upright and supported on a surface in use.

21. A frame according to claim 14, wherein the frame comprises a lifting portion provided with at least one lifting point, selected such that the frame can be suspended in the sea from the at least one lifting point.

22. A frame assembly for supporting a spool piece comprising the frame according to claim 14, and a second structure, wherein the second structure is arranged to carry the load of the frame when the second half clamp member and the first half clamp member of the frame are engaged in use.

23. A frame assembly according to claim 22, wherein the second structure is a launch frame provided with at least one substantially planar runner arranged to contact a surface in use and wherein the at least one runner is provided with an upturned end portion along at least one edge to facilitate movement of the second structure along a surface.

* * * * *